(12) United States Patent
Von Tish et al.

(10) Patent No.: US 11,995,392 B2
(45) Date of Patent: *May 28, 2024

(54) INTERFACING WITH WEB SERVICE ATTACHMENTS IN SPREADSHEETS

(71) Applicant: Oracle International Corporation, Redwood Shores, CA (US)

(72) Inventors: Kelsey Von Tish, Salem, MA (US); Edmund Alex Davis, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/120,268

(22) Filed: Mar. 10, 2023

(65) Prior Publication Data

US 2023/0214578 A1 Jul. 6, 2023

Related U.S. Application Data

(63) Continuation of application No. 17/528,950, filed on Nov. 17, 2021, now Pat. No. 11,625,527.

(51) Int. Cl.
*G06F 40/134* (2020.01)
*G06F 3/0481* (2022.01)
*G06F 3/0484* (2022.01)
*G06F 40/18* (2020.01)

(52) U.S. Cl.
CPC .......... *G06F 40/134* (2020.01); *G06F 3/0481* (2013.01); *G06F 3/0484* (2013.01); *G06F 40/18* (2020.01)

(58) Field of Classification Search
CPC .... G06F 40/134; G06F 3/0481; G06F 3/0484; G06F 40/18
See application file for complete search history.

(56) References Cited

U.S. PATENT DOCUMENTS

| 7,613,691 | B2* | 11/2009 | Finch | H04N 21/44016 |
| 7,685,152 | B2* | 3/2010 | Chivukula | G06F 40/18 |
| | | | | 707/999.102 |
| 8,307,119 | B2* | 11/2012 | Rochelle | G06F 40/103 |
| | | | | 709/248 |
| 8,447,886 | B2* | 5/2013 | Rochelle | H04L 67/01 |
| | | | | 709/248 |

(Continued)

FOREIGN PATENT DOCUMENTS

| CN | 111078331 A | * | 4/2020 | ........... G06F 21/335 |
| WO | WO-2014074964 A1 | * | 5/2014 | ........... G06F 17/246 |

*Primary Examiner* — Benjamin Smith
(74) *Attorney, Agent, or Firm* — Trellis IP Law Group, PC

(57) ABSTRACT

A computer-implemented method interfaces with a remote attachment from a spreadsheet program on a client device. A first area in the spreadsheet associates with a top-level object in a web server, and a second area associates with a descendant object. On a first user interaction with a cell in the second area, a user interface item is shown, allowing uploading and/or downloading the attachment. When the user interacts to upload or download, the program uploads (or queues for upload) a selected attachment and modifies attachment metadata in the second area, or downloads the attachment based on attachment metadata in the second area. Communication between the spreadsheet program and the web server may be REST compliant.

19 Claims, 7 Drawing Sheets

(56) References Cited

U.S. PATENT DOCUMENTS

| | | | | |
|---|---|---|---|---|
| 8,578,289 B2 * | 11/2013 | Lai | G06Q 30/08 | 715/804 |
| 8,892,679 B1 * | 11/2014 | Destagnol | H04L 65/403 | 709/212 |
| 9,330,080 B2 * | 5/2016 | Muenkel | G06F 40/18 | |
| 9,342,497 B1 * | 5/2016 | Waite | G06F 40/18 | |
| 9,501,463 B1 * | 11/2016 | Khen | G06Q 10/10 | |
| 10,044,773 B2 * | 8/2018 | Destagnol | G06F 3/01 | |
| 10,437,923 B2 * | 10/2019 | Silk | G06F 16/93 | |
| 10,466,867 B2 * | 11/2019 | Boucher | G06F 40/197 | |
| 10,466,868 B2 * | 11/2019 | Boucher | G06F 3/0485 | |
| 10,489,018 B2 * | 11/2019 | Boucher | G06F 40/14 | |
| 10,656,801 B1 * | 5/2020 | Goodman | H04L 67/10 | |
| 10,789,414 B2 * | 9/2020 | Schoedl | G06F 40/18 | |
| 10,866,935 B2 * | 12/2020 | Chung | G06F 16/168 | |
| 10,983,670 B2 * | 4/2021 | Boucher | G06F 3/0482 | |
| 11,080,476 B2 * | 8/2021 | Davis | G06F 16/907 | |
| 11,138,371 B2 * | 10/2021 | Davis | G06F 40/177 | |
| 11,210,459 B1 * | 12/2021 | Krishnaswamy | G06F 40/166 | |
| 11,243,824 B1 * | 2/2022 | Meersma | G06F 40/166 | |
| 11,308,269 B1 * | 4/2022 | Rodgers | G06F 16/93 | |
| 11,354,493 B2 * | 6/2022 | Von Tish | H04L 67/535 | |
| 11,438,286 B2 * | 9/2022 | Massand | H04L 51/08 | |
| 11,443,109 B2 * | 9/2022 | Davis | G06F 16/907 | |
| 11,443,110 B2 * | 9/2022 | Davis | G06F 16/958 | |
| 2005/0166161 A1 * | 7/2005 | Makela | G06F 3/0482 | 715/713 |
| 2007/0136666 A1 * | 6/2007 | Khen | G06Q 10/10 | 715/219 |
| 2007/0162504 A1 * | 7/2007 | Chivukula | G06F 40/18 | |
| 2007/0233811 A1 * | 10/2007 | Rochelle | H04L 67/01 | 709/219 |
| 2007/0299870 A1 * | 12/2007 | Finch | H04N 21/23424 | |
| 2011/0185305 A1 * | 7/2011 | Lai | G06F 40/18 | 715/772 |
| 2012/0330995 A1 * | 12/2012 | Muenkel | G06F 40/18 | 715/219 |
| 2013/0007118 A1 * | 1/2013 | Rochelle | G06F 8/34 | 709/223 |
| 2013/0110983 A1 * | 5/2013 | Song | G11B 27/034 | 709/219 |
| 2013/0254644 A1 * | 9/2013 | Rochelle | G06F 8/34 | 715/212 |
| 2014/0059413 A1 * | 2/2014 | Lai | G06Q 30/08 | 715/212 |
| 2014/0136936 A1 * | 5/2014 | Patel | G06F 16/972 | 715/212 |
| 2014/0136937 A1 * | 5/2014 | Patel | G06F 40/18 | 715/212 |
| 2015/0082198 A1 * | 3/2015 | Destagnol | G06Q 10/10 | 715/753 |
| 2017/0315968 A1 * | 11/2017 | Boucher | G06F 40/18 | |
| 2017/0315978 A1 * | 11/2017 | Boucher | G06F 40/177 | |
| 2017/0315979 A1 * | 11/2017 | Boucher | G06F 16/2228 | |
| 2018/0013703 A1 * | 1/2018 | Massand | G06F 3/0484 | |
| 2019/0057111 A1 * | 2/2019 | Chung | G06F 16/252 | |
| 2019/0095413 A1 * | 3/2019 | Davis | H04L 67/565 | |
| 2019/0095414 A1 * | 3/2019 | Davis | G06F 40/18 | |
| 2019/0138587 A1 * | 5/2019 | Silk | G06F 40/197 | |
| 2019/0213243 A1 * | 7/2019 | Silk | G06F 16/27 | |
| 2019/0340219 A1 * | 11/2019 | Schoedl | G06F 3/0481 | |
| 2020/0097534 A1 * | 3/2020 | Von Tish | G06F 40/177 | |
| 2020/0125713 A1 * | 4/2020 | Davis | G06F 16/958 | |
| 2020/0202066 A1 * | 6/2020 | Bodera | G06F 16/9558 | |
| 2020/0252358 A1 * | 8/2020 | Mutha | H04L 67/06 | |
| 2021/0326520 A1 * | 10/2021 | Davis | G06F 16/907 | |
| 2021/0357582 A1 * | 11/2021 | Davis | G06F 40/18 | |

* cited by examiner

INTERFACING WITH WEB SERVICE ATTACHMENTS IN SPREADSHEETS

CROSS REFERENCES TO RELATED APPLICATIONS

This application is a continuation of the following application, U.S. patent application Ser. No. 17/528,950, entitled METHOD AND SYSTEM FOR CREATING, RETRIEVING, AND EDITING WEB SERVICE ATTACHMENTS IN SPREADSHEETS, filed on Nov. 17, 2021, which is hereby incorporated by reference as if set forth in full in this application for all purposes.

This application is related to the following applications:

U.S. Pat. No. 11,138,371, entitled EDITABLE TABLE IN A SPREADSHEET INTEGRATED WITH A WEB SERVICE, issued on Oct. 5, 2021; and U.S. patent application Ser. No. 17/008,503, entitled ORCHESTRATION OF CRUD OPERATIONS FOR A HIERARCHICAL WEB SERVICE DATA MODEL IN A SPREADSHEET, filed on Aug. 31, 2020;

which are hereby incorporated by reference as if set forth in full in this application for all purposes.

Each publication, patent, and/or patent application mentioned in this specification is herein incorporated by reference in its entirety to the same extent as if each individual publication and/or patent application was specifically and individually indicated to be incorporated by reference.

BACKGROUND

Technical Field

The disclosed technology relates to web service methods used in office documents, and in particular to those using REpresentational State Transfer (REST) resources in a web service within a spreadsheet, such as Microsoft Excel, LibreOffice/OpenOffice Calc, and Google Sheets.

Context

Unless otherwise indicated herein, elements described in this section are not prior art to the claims and are not admitted being prior art by inclusion in this section.

In many situations, databases and other information sources are accessed from a cloud-based service, where the database or information service is hosted by a cloud service provider, and users access the data via Internet or another network from a client device. Services are often provided as a REST-compliant service to maximize accessibility. To view and interface with the data, users may use a dedicated database access program, or alternately, an application that is already installed and available on their device, such as a spreadsheet program that may be enhanced with an add-on or extension to provide the required functionality. Programs available include Microsoft Excel, Apache OpenOffice Calc, LibreOffice Calc, and others, which can all be enhanced with add-ons and extensions using languages such as C#, Visual Basic for Applications, OpenOffice BASIC, JavaScript, and Python.

Previous work on this technology (U.S. Pat. No. 11,138, 371) concerns the ability to perform bulk create, read, update, and delete (CRUD) operations against REST resources in a web service within a spreadsheet.

Numerous REST resources have support for attachments associated with REST resource items. These attachments, representing some sort of file or media associated with a given record, are often an integral part of a business use case. For example, consider the case where a user must submit an expense report. It is critical to attach copies of receipts to the expense report. Without some form of attachment support, the business user cannot complete filing the expense report from within the spreadsheet application. However, present solutions don't provide the capability to interact with the binary data stored on the server from within the spreadsheet. Attachment metadata includes information like file name and file size. Meaningful interaction with the attachment itself includes uploading new attachment contents and downloading existing attachment contents.

SUMMARY

In many situations, databases and other information sources are accessed from a web service, where the database or information service may be hosted by a cloud service provider, and users access the data via Internet or another network from a client device. Services are often provided as a REST-compliant service to maximize accessibility. To view and interface with the data, users may use an application that is already installed and available on their device, such as a spreadsheet program that may be enhanced with an add-on or extension to provide the required functionality. Programs available include Microsoft Excel, Apache OpenOffice Calc, LibreOffice Calc, Google Sheets, and others, which can all be enhanced with add-ons and extensions using languages such as C#, Visual Basic for Applications, OpenOffice BASIC, JavaScript, and Python.

The disclosed technology provides the capability to interact with the binary data stored on the server from within the spreadsheet, using attachment metadata that may include information like file name and file size. Meaningful interaction with the attachment itself includes uploading new attachments and downloading existing attachments.

In a first aspect, an implementation provides a computer-implemented method to interface with a remote attachment from a spreadsheet program on a client device. The method includes the following steps. In a first area of a first worksheet in the spreadsheet program, cells are associated with fields from a top-level object in a web server. Upon receiving a first user interaction, the spreadsheet program communicates with the web server and copies values of the associated cells into fields of the top-level object. In a second area of a worksheet (the first or a second worksheet), one or more cells are associated with one or more fields from a descendant object in the web server. When the user has a second user interaction with the at least a part of the one or more cells, the method responds by showing a user interface item (the second user interface item). The second user interface item waits for a third user interaction, that signals that the user wants to upload an attachment. When the spreadsheet program receives the third user action, it stores client-side attachment metadata, based on the file the user selects to upload, in the one or more cells associated with the one or more fields from the child object. The spreadsheet program uploads the attachment to the web server after the third user interaction, or after a separate user interaction to invoke upload of all queued attachments. The web server receives the attachment, and stores server-side attachment metadata in the descendant object.

The method may further comprise receiving a fourth user interaction in the user interface item, indicating that the user wants to retrieve an attachment that is stored with the web server. The method responds by communicating a download request with at least a part of the first attachment metadata to the web server. It then downloads the attachment from the web server.

Communication between the spreadsheet program and the web server may be REST-compliant.

In a second aspect, an implementation provides a client device that contains software in a memory to execute the method provided in the first aspect above.

In a third aspect, an implementation provides a non-transitory computer-readable medium that contains software in a memory to execute the method provided in the first aspect above.

A further understanding of the nature and the advantages of particular implementations disclosed herein may be realized by reference of the remaining portions of the specification and the attached drawings.

BRIEF DESCRIPTION OF THE DRAWINGS

The disclosed technology will be described with reference to the drawings, in which:

FIG. 5 illustrates an example worksheet with a first area including top-level information and a second area including attachment metadata information;

FIG. 6 illustrates a response to a user interaction in a cell in the second area;

FIG. 7 illustrates a response to another user interaction in a cell in the second area;

Figure 1:
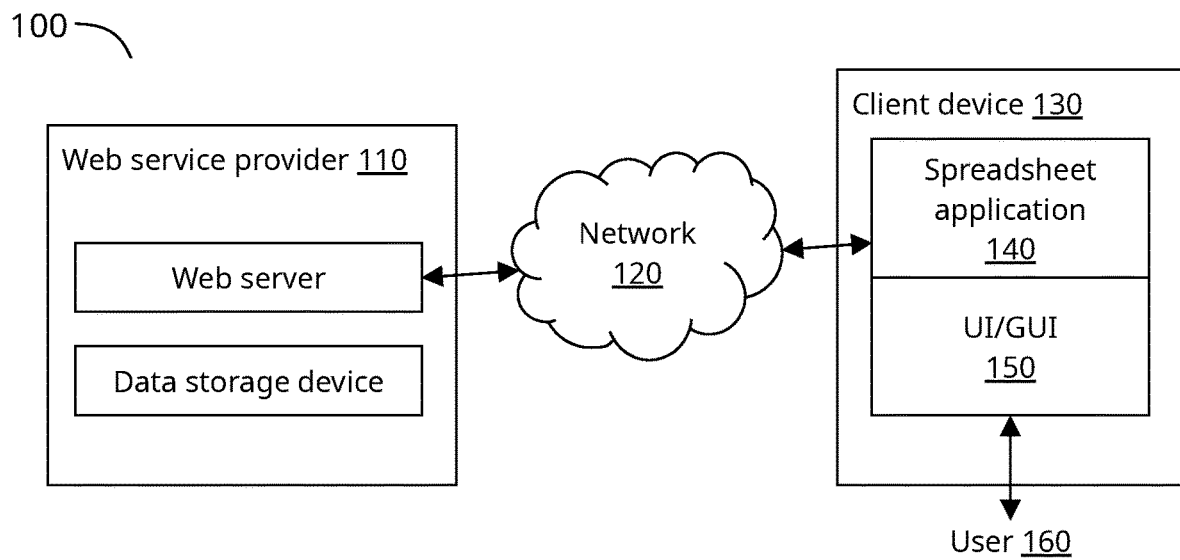
FIG. 1 illustrates an example system suitable for providing a user interface.

In the figures, like reference numbers may indicate functionally similar elements. The systems and methods illustrated in the figures, and described in the Detailed Description below, may be arranged and designed in a wide variety of different implementations. Neither the figures, nor the Detailed Description, are intended to limit the scope as claimed. Instead, they merely represent examples of different implementations of the disclosed technology.

DETAILED DESCRIPTION

Terminology

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B, and C" or the phrase "at least one of A, B, or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B, and C" or the phrase "one or more of A, B, or C" should be interpreted to mean any of: only A, only B, only C, A and B (but not C), B and C (but not A), A and C (but not B), or all of A, B, and C.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

A "processor" includes any suitable hardware and/or software system, mechanism or component that processes data, signals or other information. A processor can include a system with a general-purpose central processing unit, multiple processing units, dedicated circuitry for achieving functionality, or other systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

The term "server" and "client" generally refer to separate systems that provide and consume information, respectively. A client may request a server for information, and the server may respond with the requested information. Additionally, a client may provide a server information, which the server may store in, for example, a database, for later use. The terms "client" and "server" are relative, and in some cases the roles may switch. However, the server is often considered to be a larger system serving multiple clients, which may be relatively smaller systems.

REST Web Service—REpresentational State Transfer, an architectural style for communication between computer systems on Internet. REST-compliant systems are often called RESTful systems. Information is available on Internet, for example on www.codecademy.com/articles/what-is-rest.

Attachment—content or media associated with a data object in a web service. Attachments can have arbitrary size. Types of attachments include, but are not limited to, the following: (i) a file (PDFs, image files, etc.); (ii) text content of arbitrary length; and (iii) a web URL.

Metadata—data that defines or provides information about other data. In the context of the current patent document, metadata may, for example, be used to describe the structure of data objects, templates, and services. In the context of this document, Attachment Metadata means the information describing an attachment, for example information including the file name, description, file type, and file size.

Transitory Memory—a memory whose data content must be considered signals, i.e. of temporary nature and disappearing when the memory's power supply is removed. Transitory memory includes memories like static random-access memory (SRAM) and dynamic random-access memory (DRAM).

Non-transitory Memory—a memory whose data content can be arbitrarily long and is independent of the availability of the memory's supply power. Non-transitory memory includes non-volatile memories like read-only memory (ROM), flash memory, magnetic random-access memory (MRAM), magnetic disks, optical disks including compact disks (CDs), digital video disks (DVDs), and Blu-ray disks.

URI—Uniform Resource Identifier.

URL—Uniform Resource Locator.

Introduction

FIG. 1 illustrates an example system 100 suitable for providing a user interface. System 100 includes web service provider 110, using a data storage device to store a database or other information, and a web server (the service endpoint) to provide access remotely via network 120, which may be or include Internet, a wide area network, a local area network, a wireless network, a company intranet, or any other data network. Web service provider 110 provides its services to user 160 via client device 130, which runs spreadsheet application 140 and which provides a user interface and graphical user interface UI/GUI 150. Client device 130 may be any type of user device, including but not limited to a personal computer, a tablet, and a smartphone. Generally, client device 130 has one or more processors, and non-transitory media such as a hard disk, a solid-state memory, and/or an SRAM, in which software resides that can be executed to perform the actions described herein, including generating and displaying spreadsheets, interfacing with a user, and communicating with a web server, for example via Internet.

Spreadsheet application 140 may be any spreadsheet application or other software application operable to display a table view, i.e., a visualization providing cells arranged in rows and columns. A spreadsheet may include one or more worksheets, collectively forming a workbook. A user interface such as UI/GUI 150 may display a worksheet in a table view visualization.

Figure 2:
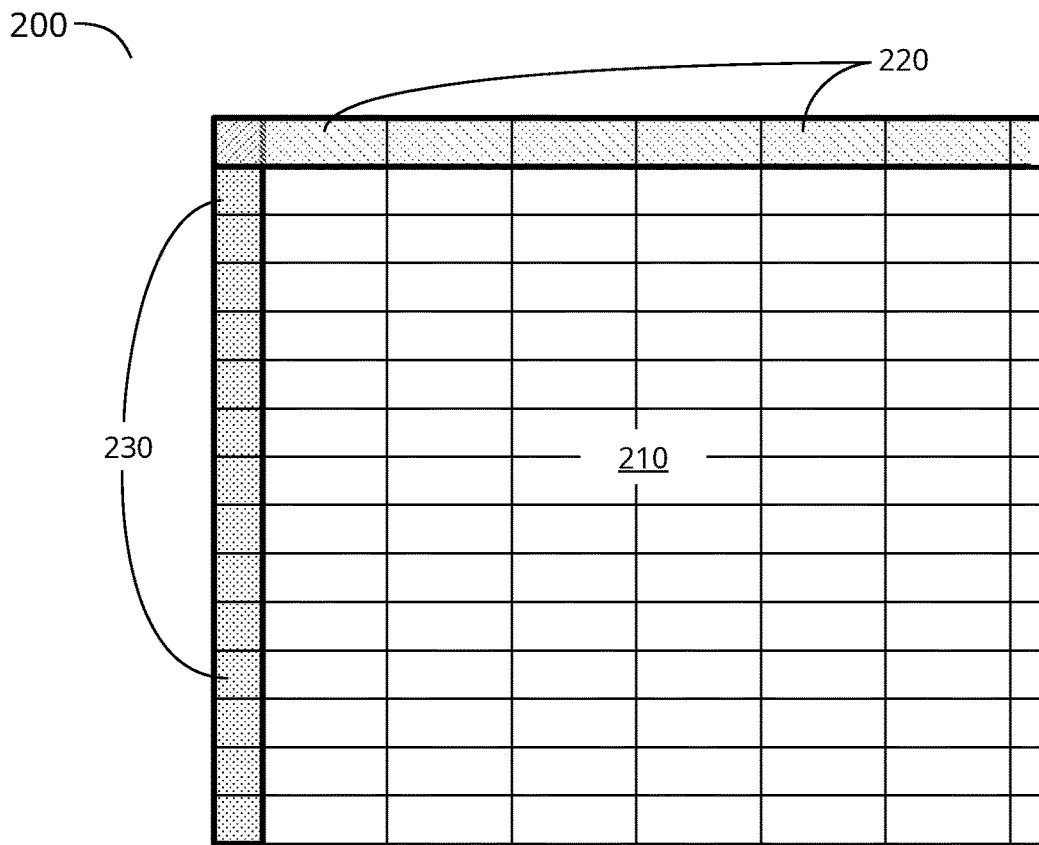
FIG. 2 illustrates an example spreadsheet page.

FIG. 2 illustrates an example worksheet 200. Worksheet 200 includes a cell area 210 with cells arranged in rows and columns. Whereas cell area 210 usually has a number of rows and columns that is defined by the spreadsheet application (such as Excel, Calc, etc.), a user generally uses a small part only. Users, or spreadsheet authors, may use or define one or more areas (also called "ranges") within a worksheet to hold relevant information. The smallest such area is a cell. A cell can hold and display data, for example a text, a number, a formula, a date, a time, a Boolean value, an image, or any other data type. In many cases, a cell is configured to hold data of a certain data type, or the cell or spreadsheet application determines the data type when data is loaded or entered into the cell. A cell may be editable, i.e., it can receive data from user input, but the cell can be set to read-only, write-only, or read-write. A cell may also be protected from changes, so that no data entry is possible. In many cases, a cell's visual attributes can be set, so that cells can be visually distinct from other cells. For example, their background or foreground color can be set, the font, font size, and font attributes can be set. At the top of each column of cells may be a column header 220, and to a side of each row, for example the left-hand side, may be a row header 230. A column header 220 can identify the column, for example by displaying a column number or column letter combination, and it also allows a user to select all cells in the column. A row header 230 can identify the row, for example by displaying a row number or row letter combination, and it also allows a user to select all cells in the row. In some cases, a column header 220 or row header 230 can display text to identify the data in the associated column or row.

Cells can also interact with users. For example, a cell can respond to a user clicking, double-clicking, hovering over, selecting, deselecting, entering, exiting, and other events. A spreadsheet program API may make such events available to macros that can be stored in the workbook or in a template workbook, and that can provide custom functionality to a spreadsheet document, or to all of a spreadsheet user's documents.

A Use Case

Consider the case of creating an expense report and filing it online. It is convenient to create an expense report from a template file in a spreadsheet program on a user device. In some cases, an expense report must be accompanied with one or more receipts that show details of the expenses. The receipts are typically file-based attachments, such as scans, PDFs, emails, web pages, or texts, associated with the expense report. In a server-client model, such as shown in FIG. 1, a user interacts with a spreadsheet on a client device. The client device communicates with a server that organizes its data in some data model. A web service, such as a REST web service, transfers the data between the spreadsheet and one or more data objects that follow the data model. The web service stores the data objects in a non-transitory data storage device that may be onsite with the web server, whereas the client device may store the spreadsheet file and attachments in its own non-transitory memory.

Figure 3:
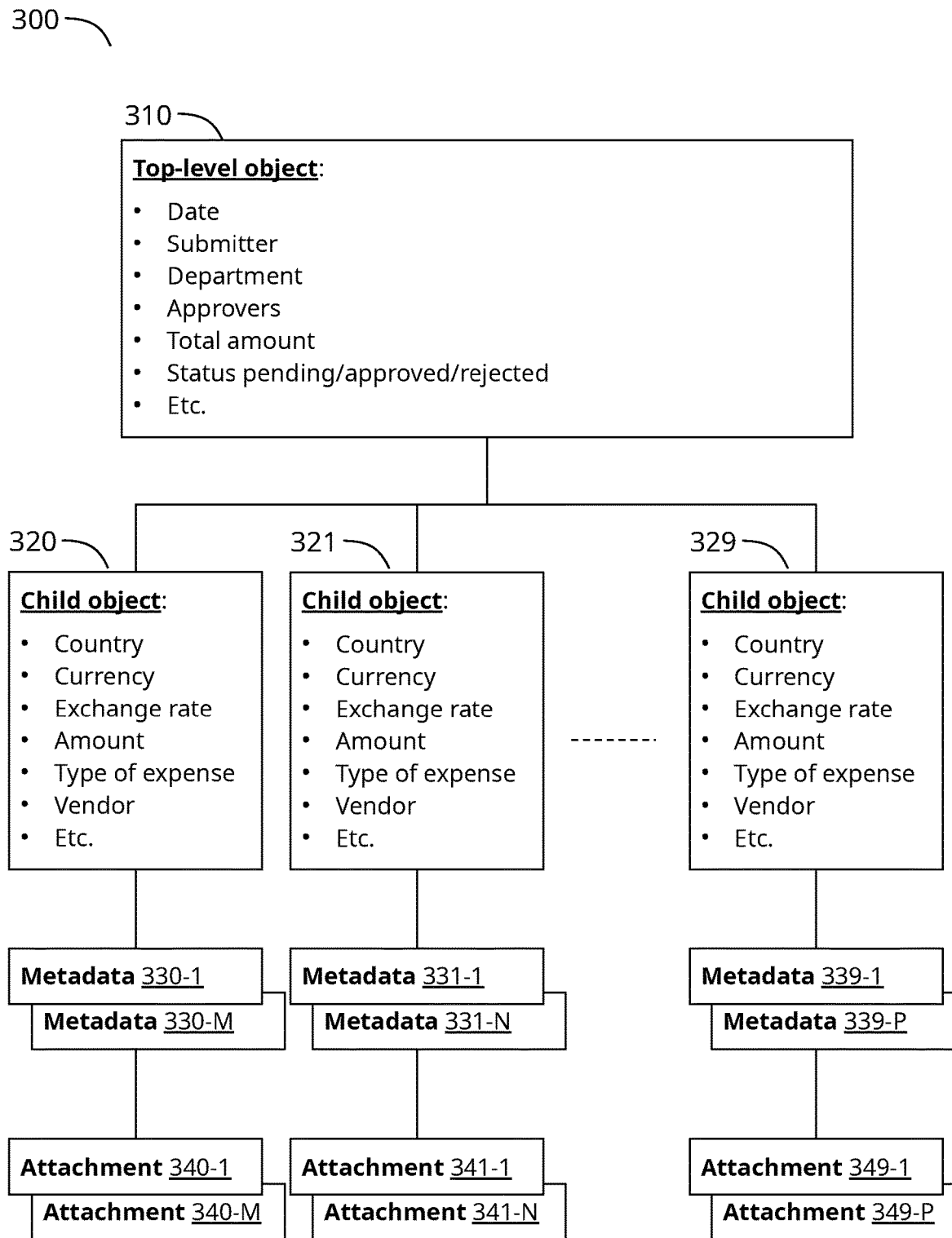
FIG. 3 illustrates a first example data model for an expense reporting use case.

FIG. 3 illustrates a first example hierarchical data model 300 for an expense reporting use case. Data model 300 includes a top-level object 310, one or more child objects (FIG. 3 shows child object 320 through child object 329) that hierarchically relate to top level object 310. Each child object can have multiple metadata items relating to multiple attachments. For example, child object 320 may have M attachments (attachment 340-1 through -M) characterized by M attachment metadata items (attachment metadata 330-1 through -M), whereas child object 321 has N attachments, characterized by N attachment metadata items.

In the context of a spreadsheet, top-level object 310 may be associated with a first area in a first worksheet in a spreadsheet workbook, where the first area lists information such as the expense report date, submitter, department, its list of approvers, the total amount, and the status of the expense report (pending, approved, rejected, returned for modification, etc.). In some implementations, the first area may be spread over multiple worksheets.

A child object may be related to a second area in a second worksheet. The second worksheet may be the same as or different than the first worksheet. The second area may include, for example, a table row related to a child object. It may include cells for the country in which an expense occurred, the currency of the expense, the exchange rate, amount, type of expense (transportation, lodging, food, communication, entertainment, other business expenses), the vendor, method of payment (cash, private credit card, company credit card), etc. The row may further hold cells that can provide a user interface to attachments, such as scans of receipts, other binary files, emails, text files, text, etc. In implementations, a cell would not include the attachment itself. Rather, the cell may include attachment metadata from an associated attachment metadata object, part or all of which may be visible or hidden to the user. The attachment metadata may include information like the attachment type, filename, file size, URI or URL, etc., allowing an implementation to interface with the attachment.

Whereas the example implementation of FIG. 3 shows some information listed under the top-level object, and other information listed under a descendant object, in another implementation information may be grouped differently. For example, a currency might be listed as information included in the top-level object. An attachment metadata item may not be a child of a child object, but may exist in an arbitrary part of the object hierarchy. Additional information may be added, and listed information may not be relevant for an implementation. The number of hierarchical levels may be different. Implementations generally have in common that they provide support within the spreadsheet for interacting with attachments, and interaction with the attachment is facilitated by attachment metadata stored in the spreadsheet, and in instances of the data model.

The hierarchy of objects in the data model is arbitrary. An attachment object may be a child, grandchild, great-grandchild, etc. of the top-level object. In another example hierarchy implementation, the top-level object may be an expense report ("ExpenseReport"), a child of ExpenseReport may be an expense ("Expense"), and a child of Expense and grandchild of ExpenseReport may be an expense attachment ("ExpenseAttachment") associated with the individual expense. Another child of ExpenseReport, and sibling of Expenses, may be an attachment associated with an expense report ("ExpenseReportAttachment"). In yet another implementation, such as a web service whose function is to share files, an attachment may be a top-level object.

Figure 4:
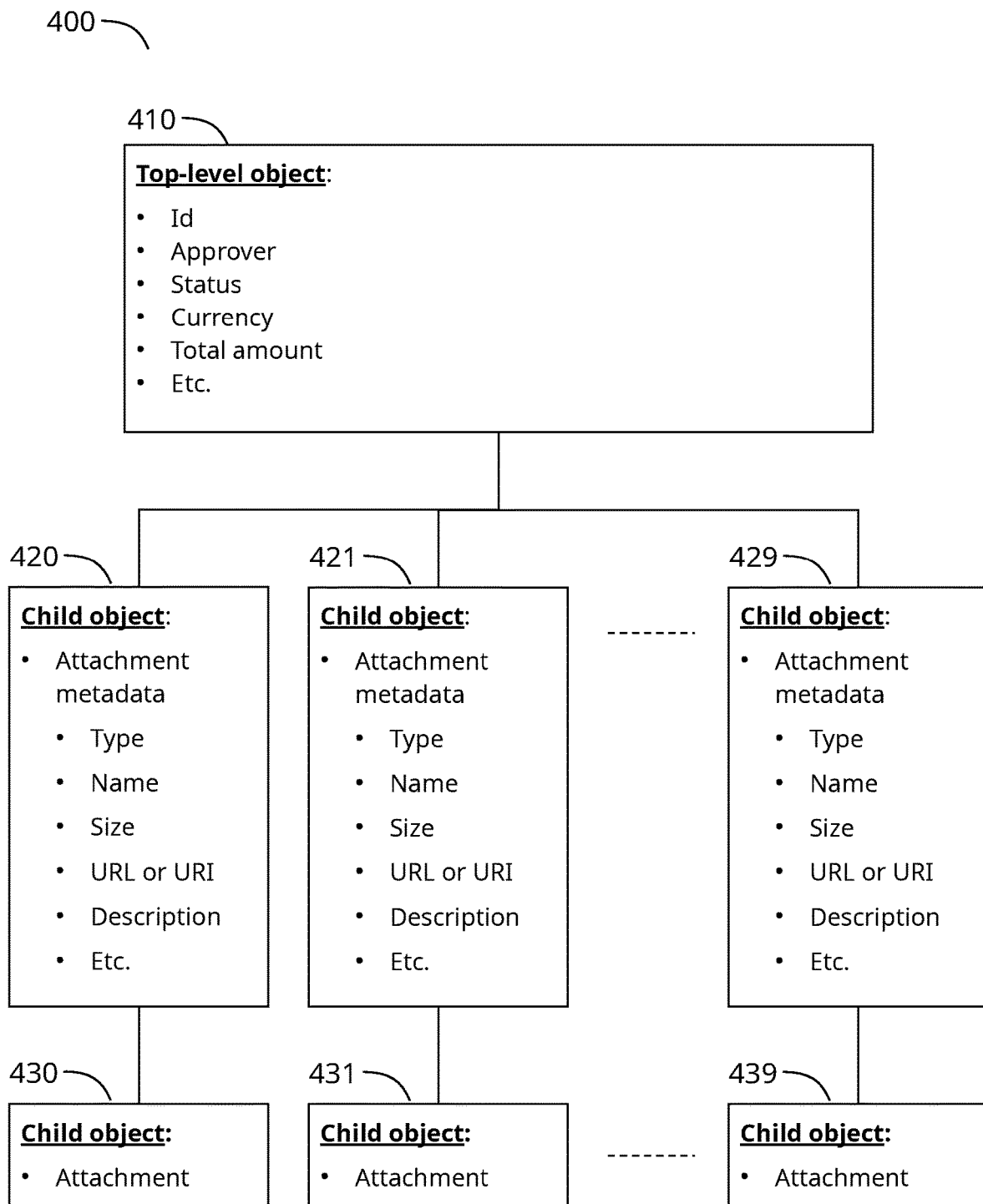
FIG. 4 illustrates a second example hierarchical data model for an expense reporting use case.

FIG. 4 illustrates a second example hierarchical data model 400 for an expense reporting use case. In this implementation example, top-level object 410 includes fields for an expense report's Id, its approver, the report's status, the currency, and the amount. Top-level object 410 has child objects that contain metadata associated with attachments. Drawn are child object 420 through child object 429, but any number of child objects is possible. Attachment metadata may include fields for the attachment type, a file name if relevant, a URL or URI if relevant, its title, and other information about the attachment. The actual attachments are child objects to the attachment metadata child objects, and thus grandchild objects to the top-level object. FIG. 4 shows grandchild object 430 through grandchild object 439, but in this case the number of grandchild objects matches the number of child objects, since each attachment is represented by one set of attachment metadata.

Implementations

Figures 5, 6, 7:
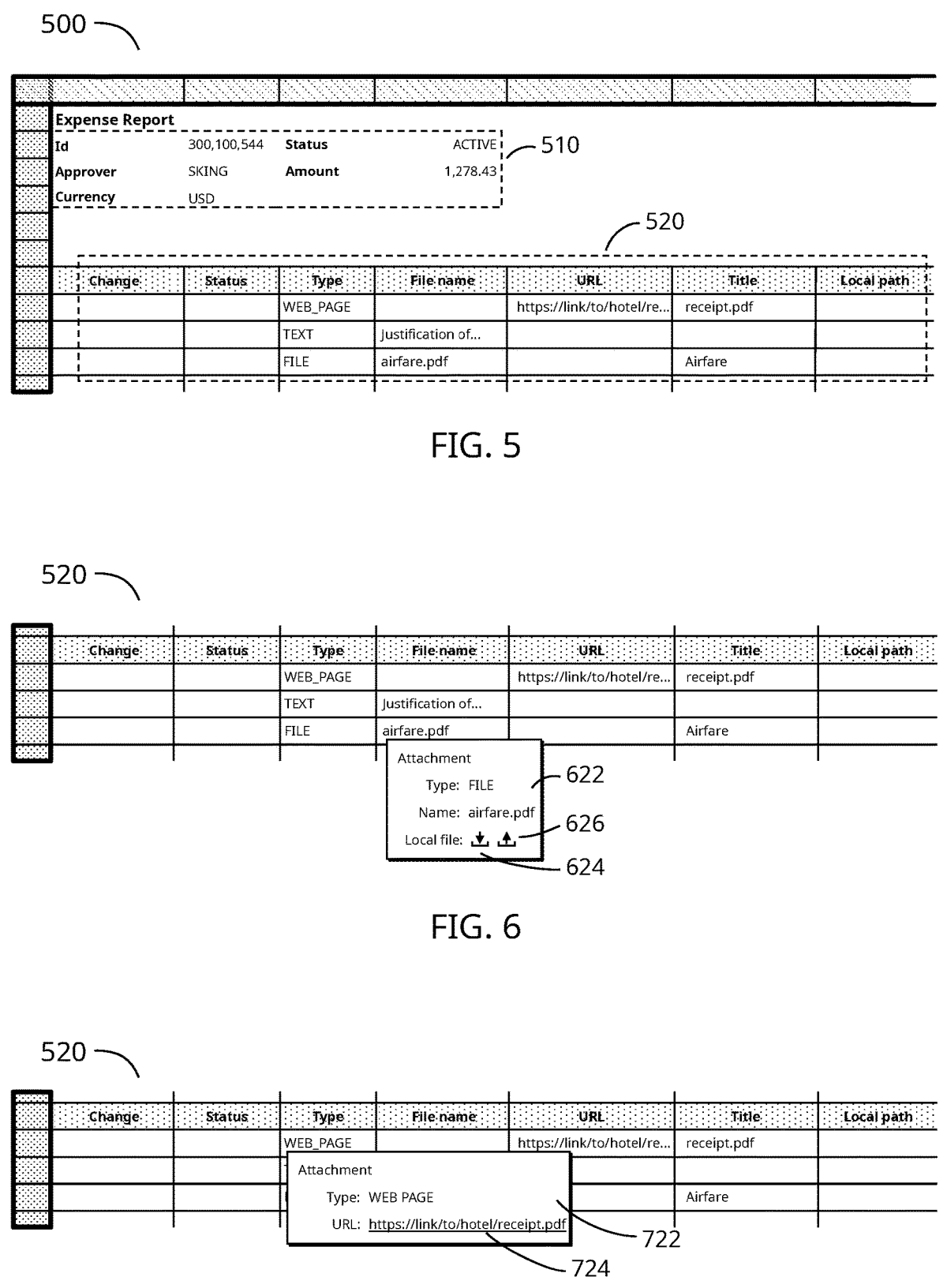

FIG. 5 illustrates an example worksheet 500 with a first area 510 including top-level information and a second area 520 including attachment metadata information. The expense report information in first area 210 may be associated with a top-level object in the web service, and the information in second area 520 represents a set of attachments for the expense report, which may be associated with one or more child objects, or other descendants, of the top-level object. This example follows the expense report data model shown in FIG. 4. First area 510 includes cells for information associated with Id, Status, Approver, Amount, and Currency fields in the top-level object. Second area 520 includes rows associated with various attachments, including a web page, a text, and a file. Although in this example implementation a single worksheet includes both the first area and the second area, in other implementations the first area and the second area may be on different worksheets. In further implementations, the first area or the second area may not be confined to a single worksheet. For example, part of the information for the top-level object could be on one worksheet and another part could be on another worksheet. Or, part of the information of the second area could be on one worksheet, and one or more other parts could be on one or more other worksheets.

FIG. 6 illustrates a response to a user interaction in a cell in the second area 520. For example, the user may have clicked in or entered the cell "airfare.pdf" in the column "File name", or anywhere else in the row that includes the cell. In response to receiving the user interaction, the implementation responds by showing a user interface item, in this example a context popup 622. A context popup may include widgets such as a menu, icons, buttons, checkboxes, radio buttons, etc. Context popup 622 includes, as an example, information about the attachment. It shows that the attachment is a FILE with the name "airfare.pdf", and it shows a download button 624 and an upload button 626. Some implementations may show further widgets, for example to edit the link or location and type of attachment, to browse to another location, or to remove the attachment. When the user clicks on download button 624 (another user interaction), the user may download the file airfare.pdf to store a local copy on the client device. Some implementations may respond to this user interaction by showing a common dialog, such as a "Save As" common dialog that is available in many operating systems, allowing the customer to choose a location for the local copy. Other implementations may store the local copy in a predetermined location, without giving the user an option to choose. After downloading the attachment, the worksheet may show the location of the downloaded attachment in the column "Local path". It may also show the location near download button 624 for example on the line that reads "Local file". When the user clicks on upload button 626 (yet another user interaction), the user may upload a different file to the server (or queue the file for upload). An implementation may respond to this user interaction by showing a common dialog, such as an "Open File" common dialog that is available in many operating systems, allowing the customer to select and upload (or queue) a file that is stored on the client device. Some implementations may immediately upload the selected file to the server. Implementations that queue the selected file may modify the "Change" column to read Create or Update, and wait for the user to invoke the actual upload action, for instance by pressing a button "Upload changes" that may be in the worksheet, on a toolbar, on a ribbon, menu, statusbar, task pane, etc. After committing, the implementation may upload all queued attachments to the server, clear the "Change" column, and list the status as succeeded or otherwise in the "Status" column. Some implementations may have further buttons or widgets in context popup 622, for example a button or widget to rename an attachment, or to delete an attachment.

An upload via a REST web service may include two steps. For example, in a first step, the client device may send a JSON message to the service as follows:

Request body:
{
"DatatypeCode": "FILE",
"FileName": "airfare.pdf",
"Url": "null",
"Title": "Airfare",
"Description": "Roundtrip SFO - CDG November 2021"
} and in a second step, the client device may send a message with a Request body including the binary data.

An upload via a REST web service may also be performed in a single step, for example as follows:

```
Request body:
{
"DatatypeCode": "FILE",
"FileName": "airfare.pdf",
"Url": "null",
"Title": "Airfare",
"Description": "Roundtrip SFO - CDG November 2021"
"Contents": [a Base64 encoded string representing the attachment data]
}
```

By combining the intuitive ease of using a spreadsheet for an expense report, the capabilities of a REST webservice, and the data model, an implementation allows for convenient interaction between the user having a client device and the web service that handles the information collection and processing needs in an organization that the user is linked to, for example an enterprise of which the user is an employee.

FIG. 7 illustrates a response to another user interaction in a cell in the second area 520. In this case, the user may have clicked anywhere in the row that includes the cell for a web address that serves a PDF document "receipt.pdf". The implementation responds to the user interaction by showing another user interface item, context popup 722. In this example implementation, context popup 722 again shows information about the attachment, whose type is WEB PAGE, and of which it shows a clickable URL 724. Although the web service may not manage the attachment (since it could be an external URL), access to the file via the URL benefits both the web service and the user. In this case, the user controls the attachment metadata in both the spreadsheet and the server, both the user and the web service may (or may not) hold copies of the attachment, but neither controls it. Some implementations may use a URI instead of a URL. Whereas a URL includes the protocol for accessing an attachment (for example, https://), a URI only identifies an attachment. An implementation may, for example, support BOOK as a type of attachment, and might identify the book by its URI, which could be its ISBN number. Using a URI instead of a URL can be useful in situations where there are multiple ways of accessing the attachment, or both the web server and the client device have a known way of accessing a particular attachment type.

The implementations in FIGS. 5-6 communicate between the client device and the web server. Not every such communication needs to involve an attachment upload or download. For example, a user may want to rename an attachment, without changing its content, or remove the attachment. In such cases, the only thing communicated may be the changed attachment metadata. Attachment metadata stored in the spreadsheet on the client device, may overlap attachment metadata stored in the data model. However, it does not need to be identical. For example, the local path, i.e., the location of the local copy of an attachment, needs to be known by the client device only. The client device's local path for the attachment does not need to be stored by the data model. Likewise, the storage location at the data storage device of the web service is not relevant for the client device, or the user may not be privileged to know the storage location. Thus, while some attachment metadata information is shared, other attachment metadata information is not shared.

Figure 8:
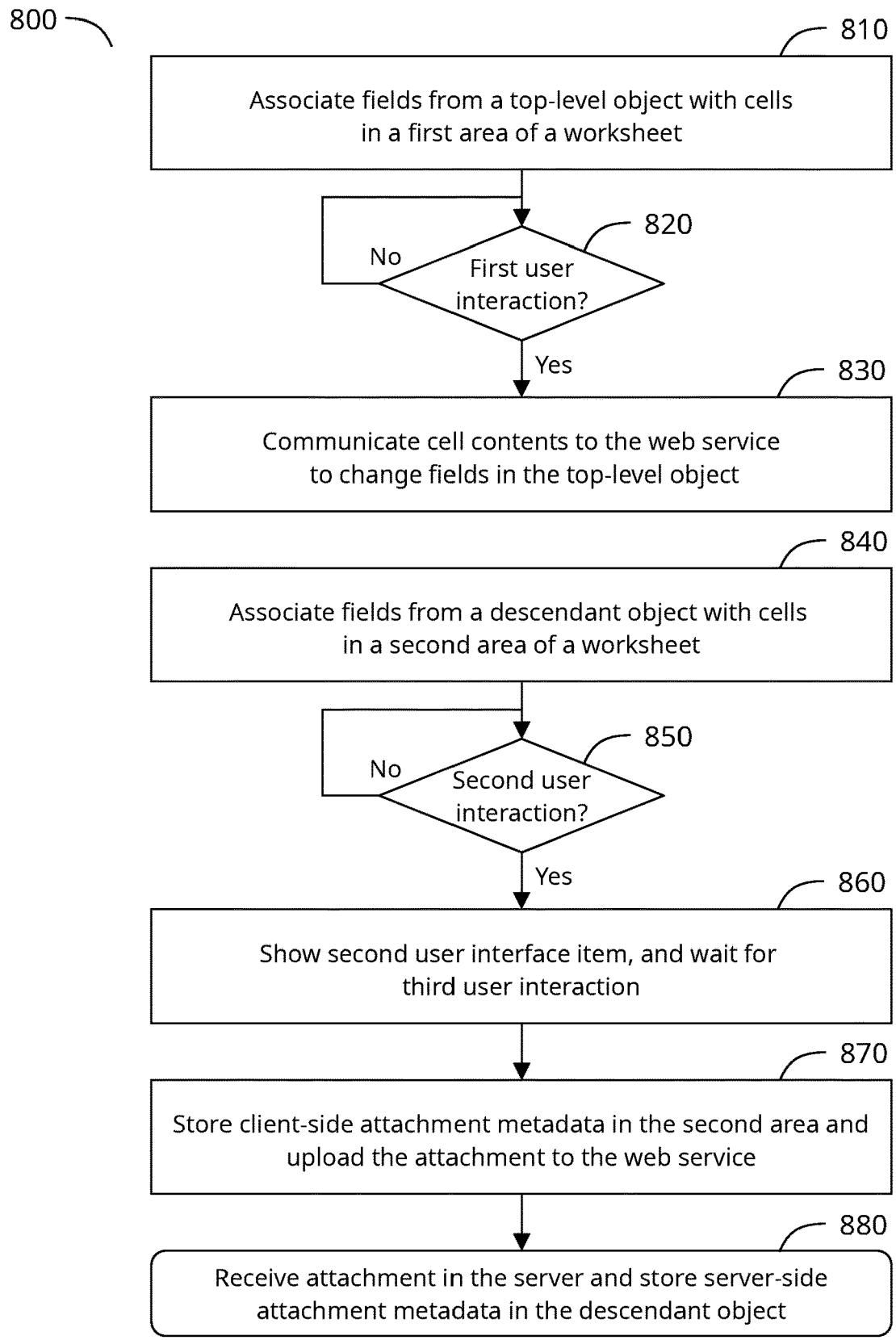
FIG. 8 illustrates a computer-implemented method to interface with attachments.

FIG. 8 illustrates a computer-implemented method 800 to interface with attachments. Method 800 assumes a system similar to system 100, where a client device communicates with a web service. The web service may communicate via a web server, and run an application, for example a database application, that has records consistent with the data model, and that can receive, store, retrieve, and send attachments. There may be several types of attachment, for instance FILE, EMAIL, WEB_PAGE, or TEXT. Different types of attachments may have different sets of attachment metadata. The web service may be REST-compliant. It works with a data model that includes a top-level object and one or more descendant objects. Method 800 comprises the following steps.

Step 810—in a first area of a first worksheet on a client device, associating cells with fields from the top-level object. The client device may run a spreadsheet program that shows a spreadsheet including the first worksheet. The first area may include top-level information, for example different cells in the first area may include information that matches different fields in the top-level object.

Step 820—waiting for and receiving a first user interaction to copy values of the associated cells into fields in the top-level object. In some implementations, the first user interaction may be the simple fact of modifying a cell in the first area. In other implementations, the first user interaction may be giving a command (e.g., by pressing a button) to upload changes in the first worksheet to the web server.

Step 830—in response to receiving the first user interaction, communicating contents of the associated fields to the web server to change the fields in the top-level object.

Step 840—associating one or more cells in a second area of a second worksheet on the client device with one or more fields in a descendant object, and associating at least part of the one or more cells with a second user interface item. The second worksheet may be the first worksheet or a different worksheet.

Step 850—waiting for and receiving a second user interaction in the at least part of the one or more cells associated with the second user interface item.

Step 860—in response to receiving the second user interaction, showing the second user interface item, and waiting for receiving a third user interaction, that signals that the user wants to upload an attachment and associate the attachment with the child object. The attachment may be or include a binary file, a text, a text file, an email, a web page, a document in a remote or separate repository/document management system (represented in the attachment metadata by a URL or URI), or any other file that holds data relevant to the needs of an organization.

Step 870—in response to receiving the third user interaction, storing client-side attachment metadata in the second area and uploading the attachment to the web server. Client-side metadata may overlap server-side metadata, but may also include information that is not relevant for the web service, such as the path where the client device locally stores the attachment. Server-side metadata may include information that is not relevant for the client device, or that the user is not privileged to receive, such as the location where the web service stores the attachment. An implementation may upload the attachment immediately upon receiving the third user interaction, or may require a further user interaction that invokes uploading of one or more queued attachments.

Step 880—receiving the attachment in the web server, and storing server-side attachment metadata in the child object. The web server determines a location where it will store the received attachment, stores the received attachment, and includes the location in the second attachment metadata.

Figure 9:
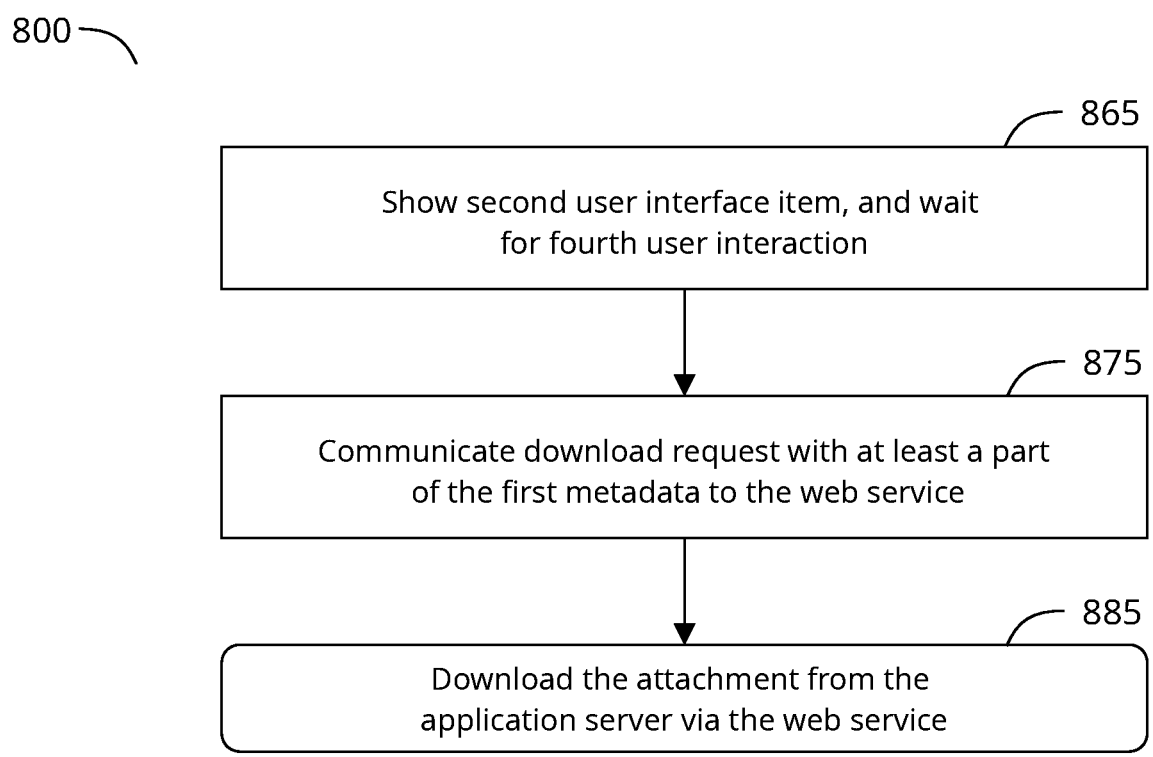
FIG. 9 illustrates additional steps for the method in FIG. 8.

FIG. 9 illustrates additional steps for method 800, including:

Step 865—in the second user interface item, waiting for and receiving a fourth user interaction, that signals that the user wants to retrieve the attachment from the web server and download it to the client device.

Step 875—in response to receiving the fourth user interaction, communicating a download request with at least a part of the first metadata to the web server.

Step 885—downloading the attachment from the web server.

FIGS. 8-9 illustrate some of the user interactions with a spreadsheet. In implementations, there may be many more interactions, and more ways to interact with objects in the hierarchy. For example, a user may start with a blank spreadsheet, or a spreadsheet that is a copy of an empty template. The user may either want to create a new record at the web service, and link the spreadsheet to the new record. Or the user may want to copy the contents of an existing top-level object and its descendants into a new top-level object with descendants, link the spreadsheet to the new object hierarchy, and copy all or part of the information into the spreadsheet. U.S. patent application Ser. No. 17/008,503, which is incorporated by reference into the present application, generally defines interaction between the spreadsheet and the object hierarchy.

Figure 10:
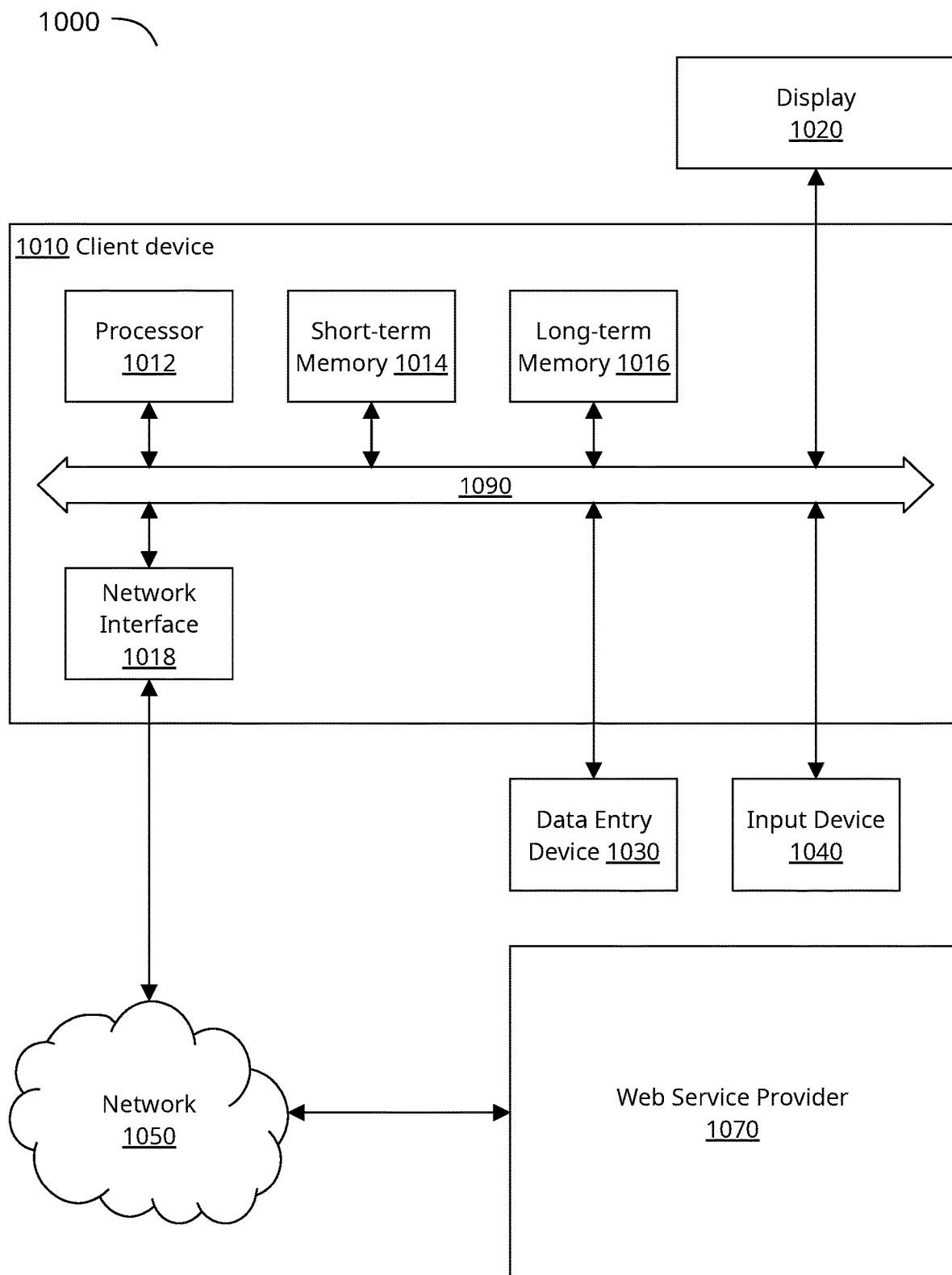
FIG. 10 is a block diagram of an exemplary computer system for use with implementations described herein.

FIG. 10 is a block diagram of an exemplary computer system 1000 for use with implementations described herein. Computer system 1000 is merely illustrative and not intended to limit the scope of the claims. One of ordinary skill in the art would recognize other variations, modifications, and alternatives. For example, computer system 1000 may be implemented in a distributed client-server configuration having one or more client devices in communication with one or more server systems.

In one exemplary implementation, computer system 1000 includes a client device 1010, which may be coupled with or include a display device 1020 such as a monitor, a data entry device 1030 such as a keyboard, a touch device, and the like, a user input device 1040, such as a mouse, a trackball, a track pad, wireless remote, tablet, touch screen, and the like. User input device 1040 typically allows a user to select and operate objects, icons, text, characters, and the like that appear, for example, on display device 1020.

Client device 1010 typically includes familiar computer components such as a processor 1012, a short-term memory 1014, e.g., a RAM, long-term memory 1016, e.g. a hard-disk drive, solid-state drive, or optical storage media such as a DVD drive, network interface 1018, and system bus 1090 interconnecting the above components. In one implementation, client device 1010 is a personal computer having multiple microprocessors, GPUs, and the like. In another implementation, client device 1010 is a server that may be operating stand-alone or in an arrangement with multiple other servers.

Network interface 1018 may include an Ethernet card (or module or integrated circuit), a modem (telephone, satellite, cable, ISDN), a DSL unit (synchronous or asynchronous), and the like. Further, network interface 1018 may be physically integrated on the motherboard of client device 1010, or may be a software program, such as soft DSL, or the like.

While FIG. 10 shows a computer, it will be readily apparent to one of ordinary skill in the art that many other hardware and software configurations are suitable for use with the present disclosed technology. Short-term memory 1014 and long-term memory 1016 are examples of tangible non-transitory computer readable media for storage of data, computer programs, databases, electronic documents, audio/video files, and the like. Examples of long-term memory 1016 further include a floppy disk, CD-ROM drive, bar codes and QR codes, a semiconductor memory such as a flash drive, flash memory, ROM, battery-backed volatile memory, networked storage device, Cloud storage, and the like.

Computer system 1000 may also include software that enables communication over communication network 1050 such as using HTTP, TCP/IP, RTP/RTSP, WAP, IEEE 802.11, and other protocols. In addition to and/or alternatively, other communication software and transfer protocols may also be used, for example FTP, IPX, UDP or the like. Communication network 1050 may include Internet, a wide area network, a local area network, a wireless network, an intranet, a switched network, or any other suitable public or private communication network, such as for example cloud networks. Communication network 1050 may include many interconnected computer systems and any suitable communication links such as hardwire links, optical links, satellite or other wireless communications links such as Bluetooth, WiFi, wave propagation links, or any other suitable mechanisms for communication of information. Communication network 1050 may be operable for communicating with web service provider 1070. Communication network 1050 may further enable communication with a remote mobile device 1080 such as a mobile phone or a tablet, via wireless transceiver 1060, which may be, or include, a base station or a WiFi router.

CONSIDERATIONS

Although the description has been described with respect to particular implementations thereof, these particular implementations are merely illustrative, and not restrictive. For example, although several examples in this document highlight using the technology for a business expense report, the technology may be applied to any other use of a spreadsheet that interacts with a web service, and that has a need to upload, download, or otherwise work with attachments.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Any suitable programming language can be used to implement the routines of particular implementations including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular implementations. In some particular implementations, multiple steps shown as sequential in this specification can be performed at the same time.

Particular implementations may be implemented in a tangible, non-transitory computer-readable information storage medium for use by or in connection with the instruction execution system, apparatus, system, or device. Particular implementations can be in the form of control logic in software or hardware or a combination of both. The control logic, when executed by one or more processors, may be operable to perform that which is described in particular implementations. For example, a tangible, non-transitory computer-readable information storage medium such as a hardware storage device can be used to store the control logic, which can include executable instructions.

Particular implementations may be implemented by using a programmed general-purpose digital computer, by using application specific integrated circuits, programmable logic devices, field programmable gate arrays, optical, chemical, biological, quantum or nano-engineered systems, components and mechanisms may be used. In general, the functions of particular implementations can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

What is claimed is:

1. A computer-implemented method to interface with remote attachments, comprising:
    providing by a web server, a hierarchy of objects in a data model of a spreadsheet;
    in the spreadsheet on a client device, associating one or more cells with one or more fields in an object of the hierarchy of objects;
    associating at least part of the one or more cells with a first user interface item that includes a context popup having one or more widgets to upload and download an attachment that includes one of a file, an email, a web page, or a document, wherein the one or more widgets for download include a uniform resource locators (URLs);
    in response to receiving a first user interaction with the one or more cells, showing the first user interface item including the context popup appearing over at least a portion of the spreadsheet;
    in response to receiving a second user interaction in the first user interface item to upload the attachment, storing client-side attachment metadata that enables interfacing with the attachment, in at least one attachment cell of the one or more cells, wherein the at least one attachment cell excludes the attachment, and wherein the context popup displays at least a part of the client-side attachment metadata; and
    receiving the attachment from the web server by downloading the attachment as a local copy on the client device; and
    storing server-side attachment metadata for the attachment in an object of the hierarchy of objects.

2. The computer-implemented method of claim 1, wherein the attachment is represented by at least one of: the client-side attachment metadata and the server-side attachment metadata.

3. The computer-implemented method of claim 2, wherein the client device controls at least one of: the client-side attachment metadata in the spreadsheet and the server-side attachment metadata.

4. The computer-implemented method of claim 1, wherein the client device lacks privilege to access to at least part of the server-side attachment metadata.

5. The computer-implemented method of claim 1, wherein the context popup further includes one or more additional widgets for actions selected from an action group including: editing a link to the attachment, editing a location of the attachment, editing a type of the attachment, browsing to another location for the attachment, removing the attachment, renaming the attachment, or deleting the attachment.

6. The computer-implemented method of claim 1, further comprising:
    downloading the attachment to store a local copy on the client device; and
    displaying information regarding a location of the downloaded attachment in the spreadsheet.

7. The computer-implemented method of claim 1, wherein the one or more widgets for upload is enabled to upload changes to update the attachment.

8. A client device comprising:
    one or more processors; and
    logic encoded in one or more tangible non-transitory media for execution by the one or more processors and when executed operable for:
        in a spreadsheet on a client device, associating one or more cells with one or more fields in an object of a hierarchy of objects in a data model of the spreadsheet provided by a web server;
        associating at least part of the one or more cells with a first user interface item that includes a context popup having one or more widgets to upload and download an attachment that includes one of a file, an email, a web page, or a document, wherein the one or more widgets for download include a uniform resource locators (URLs);
        in response to receiving a first user interaction with the one or more cells, showing the first user interface item including the context popup appearing over at least a portion of the spreadsheet;
        in response to receiving a second user interaction in the first user interface item to upload the attachment, storing client-side attachment metadata that enables interfacing with the attachment, in at least one attachment cell of the one or more cells, wherein the at least one attachment cell excludes the attachment, and wherein the context popup displays at least a part of the client-side attachment metadata;
        receiving the attachment from the web server by downloading the attachment as a local copy on the client device; and
        providing the attachment to the web server to facilitate the web server to store server-side attachment metadata in an object of the hierarchy of objects.

9. The client device of claim 8, wherein the logic is further operable for:
    controlling at least one of: the client-side attachment metadata in the spreadsheet and the server-side attachment metadata.

10. The client device of claim 8, wherein the client device lacks privilege to access to at least part of the server-side attachment metadata.

11. The client device of claim 8, wherein the context popup further includes one or more additional widgets for actions selected from an action group including: editing a link to the attachment, editing a location of the attachment, editing a type of the attachment, browsing to another location for the attachment, removing the attachment, renaming the attachment, or deleting the attachment.

12. The client device of claim 8, wherein the logic is further operable for:
 downloading the attachment to store a local copy; and
 displaying information regarding a location of the downloaded attachment in the spreadsheet.

13. The client device of claim 8, wherein the one or more widgets for upload is enabled to upload changes to update the attachment.

14. A non-transitory computer-readable medium including one or more instructions executable by one or more processors for:
 in a spreadsheet on a client device, associating one or more cells with one or more fields in an object of a hierarchy of objects in a data model of the spreadsheet provided by a web server;
 associating at least part of the one or more cells with a first user interface item that includes a context popup having one or more widgets to upload and download an attachment that includes one of a file, an email, a web page, or a document, wherein the one or more widgets for download include a uniform resource locators (URLs);
 in response to receiving a first user interaction with the one or more cells, showing the first user interface item including the context popup appearing over at least a portion of the spreadsheet;
 in response to receiving a second user interaction in the first user interface item to upload the attachment, storing client-side attachment metadata that enables interfacing with the attachment, in at least one attachment cell of the one or more cells, wherein the at least one attachment cell excludes the attachment, and wherein the context popup displays at least a part of the client-side attachment metadata;
 receiving the attachment from the web server by downloading the attachment as a local copy on the client device; and
 providing the attachment to the web server to facilitate the web server to store server-side attachment metadata in an object of the hierarchy of objects.

15. The non-transitory computer-readable medium of claim 14, wherein the one or more instructions are further executable for:
 controlling at least one of: the client-side attachment metadata in the spreadsheet and the server-side attachment metadata.

16. The non-transitory computer-readable medium of claim 14, wherein the client device lacks privilege to access to at least part of the server-side attachment metadata.

17. The non-transitory computer-readable medium of claim 14, wherein the context popup further includes one or more additional widgets for actions selected from an action group including: editing a link to the attachment, editing a location of the attachment, editing a type of the attachment, browsing to another location for the attachment, removing the attachment, renaming the attachment, or deleting the attachment.

18. The non-transitory computer-readable medium of claim 14, wherein the one or more instructions are further executable for:
 downloading the attachment to store a local copy; and
 displaying information regarding a location of the downloaded attachment in the spreadsheet.

19. The non-transitory computer-readable medium of claim 14, wherein the one or more widgets for upload is enabled to upload changes to update the attachment.

* * * * *